United States Patent [19]

Komoto et al.

[11] 4,346,967

[45] Aug. 31, 1982

[54] ZOOM LENS BARREL FOR MACROPHOTOGRAPHING

[75] Inventors: Shinsuke Komoto, Tokyo; Tetsuo Sekiguchi, Kumagaya, both of Japan

[73] Assignee: Asahi Kogaku Kogyo Kabushiki Kaisha, Tokyo, Japan

[21] Appl. No.: 160,334

[22] Filed: Jun. 17, 1980

[30] Foreign Application Priority Data

Jun. 25, 1979 [JP] Japan .................. 54-86911[U]

[51] Int. Cl.³ .................................. G02B 7/10
[52] U.S. Cl. .................................. 350/430
[58] Field of Search .............. 350/430, 429, 426, 255

[56] References Cited

U.S. PATENT DOCUMENTS

| | | | |
|---|---|---|---|
| 3,841,735 | 10/1974 | Katagiri et al. | 350/430 |
| 4,114,984 | 9/1978 | Muryoi | 350/430 |
| 4,168,884 | 9/1979 | Tesch | 350/430 |
| 4,171,880 | 10/1979 | Mori et al. | 350/430 |

*Primary Examiner*—Jon W. Henry
*Attorney, Agent, or Firm*—Sughrue, Mion, Zinn, Macpeak & Seas

[57] ABSTRACT

A two-lens group type zoom lens having a high magnification factor and simple structure yet having smooth transfer between normal zooming and macrophotographing positions. The positions of the first and second lens groups are defined by a respective zooming cam slot and lead slot formed in a cam sleeve. For focusing, a focusing operation sleeve is rotated to determine the position of the first lens group along the optical axis. A linear slot is provided extending from a telephoto end position of the zooming cam slot parallel to the optical axis direction of the lens. Additional circumferential slots may be provided extending from the zooming cam slot and lead slot and a click-stop mechanism utilized to stop the zooming operation sleeve at the telephoto end position and macrophotographing range position.

10 Claims, 5 Drawing Figures

ZOOM LENS BARREL FOR MACROPHOTOGRAPHING

BACKGROUND OF THE INVENTION

The present invention relates to a two-lens group type zoom lens which is composed of a first divergent lens group and a second convergent lens group and in which the first lens group is moved back and forth along the optical axis for focusing and both lens groups are moved along the optical axis for zooming. More particularly, the invention relates to a zoom lens having a macrophotographing mechanism including a focusing operational portion and a zooming operational portion.

Recently, there have been proposed a variety of so-called macro zoom lenses, that is, close focusing zoom lenses in which close-up photographing beyond the normal focusing range is possible. Such zoom lenses have already been in extensive use.

The above mentioned photographing mechanisms are applicable to a two-lens group type zoom lens. For example, there is a known mechanism in which macrophotographing is conducted by advancing the second lens group from a regular wide angle position. However, in lenses of this type, the magnification factor tends to be rather low even for telephoto operation. Additionally, with this mechanism, to move to the macrophotographing position, the lens must first be returned to the wide angle position before the change-over to the macrophotographing position can be accomplished. Therefore, the operationability of the lens is less than desired since the object seen through the viewfinder of an SLR camera first appears small and thereafter is reduced during change-over so that uniform, continuous and convenient operation of the lens is impossible.

Another mechanism is known in which the entire lens system is advanced to change to the macrophotographing position. In this mechanism, a movement mechanism or an interlock mechanism used in normal photographing to prevent accidental advance of the lens system is required. Accordingly, the mechanism is intricate in construction.

In order to overcome the above noted drawbacks inherent in the prior art mechanisms, a primary object of the present invention is to provide a macrophotographing mechanism providing a high magnification factor yet having a simple structure which has a uniform, continuous mode of operation.

SUMMARY OF THE INVENTION

This and other objects are achieved by providing a macrophotographing mechanism in which linear movement of the zooming operational portion is possible only when the zooming operational portion is positioned at the telephoto end, independent of the amount of movement of the first lens group, in response to the rotation of the focusing operational portion, the macrophotographing range is continuous from the telephoto range, and the magnification is increased.

Specifically, in accordance with these and other objects of the invention, there is provided a zoom lens capable of performing macrophotographing operations including a zooming operation sleeve and a focusing operation sleeve. For zooming, the zooming operation sleeve is rotatable so that the positions of first and second lens groups are defined by a zooming cam slot and a lead slot formed in a cam sleeve while for focusing the focusing operation sleeve is rotatable to determine the position of the first lens group in the direction of the optical axis. A linear slot is provided extending from a telephoto end position of a zooming cam slot forwardly parallel to the optical axis direction of the two lens groups. The lead slot is preferably a cam slot. In a preferred embodiment, an additional circumferential slot is provided extending from the telephoto end position of the zooming cam slot and an additional circumferential slot is provided extending from the lead slot. Yet further, a click-stop mechanism may be provided for stopping the zooming operation sleeve at the telephoto end position of the zooming cam slot and at a macrophotographing range position.

DESCRIPTION OF THE PREFERRED EMBODIMENTS

Figure 1:
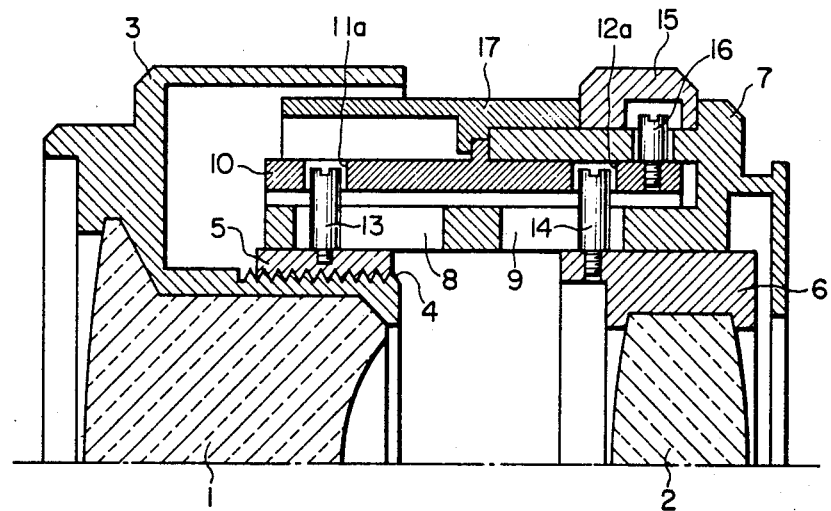
FIG. 1 is an upper side cross-sectional view of a zoom lens according to the present invention.

The present invention will now be described with reference to the accompanying drawings. FIG. 1 is an upper side cross-section of a lens mount barrel for a two-lens group type zoom lens constructed according to the present invention.

A divergent first lens group 1 is supported by a focusing operation sleeve 3 while a convergent second lens group 2 is supported by a support barrel 6. A slidable sleeve 5 is threadedly engaged with the focusing operation sleeve 3 through helicoid threads 4. A fixed sleeve 7 having a mount portion for attachment to and detachment from a camera body (not shown) surrounds the support barrel 6 and is slidably coupled to a cam sleeve 10. Guide pins 13 and 14 extending from the sliding sleeve 5 and the support barrel 6, respectively, are engaged with linear guide slots 8 and 9, respectively, formed in the fixed sleeve 7 extending parallel to the optical axis. Also, the guide pins are respectively engaged with a cam slot or groove 11a and a lead slot or groove 12a formed in the cam sleeve 10 for implementing the zooming operation. A zooming operation sleeve 15 surrounds the fixed sleeve 7. A transmission pin 16 is provided for transmitting rotational movement of the zooming sleeve 15 to the cam sleeve 10. An outer sleeve 17 rigidly coupled to the fixed sleeve 7 prevents movement of the cam sleeve 10 and the zooming operation sleeve 15 in the direction of the optical axis.

Figure 2:
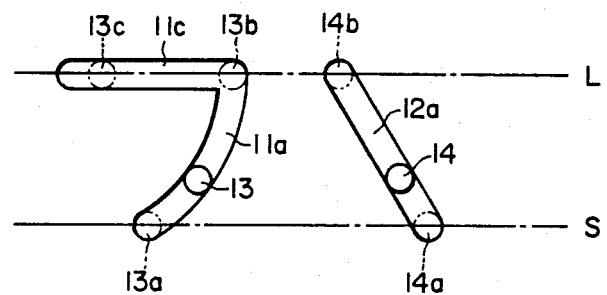
FIG. 2 is an enlarged view schematically showing the relationship between the guide pins and the slots formed in the cam sleeve.

FIG. 2 is an enlarged view schematically showing the relationship between the guide pins and the guide slots of the cam sleeve. In the cam sleeve 10 is formed a linear slot 11c parallel to the optical axis and continuous with the cam slot 11a at the telephoto end position L of the cam slot 11a in which the guide pin 13 is engaged. Also in the cam sleeve 10 is formed the lead slot 12a in which the guide pin 14 is engaged. Reference characters 13a and 14a designate positions of the guide pins 13 and 14 at the wide angle end position S and reference characters 13b and 14b denote positions of the guide pins 13 and 14 at the telephoto end position L. Reference character 13c denotes a position of the guide pin 13 for macrophotographing. For macrophotographing, the guide pin 14 is at the same position 14b as for the telephoto end L.

Figure 3:
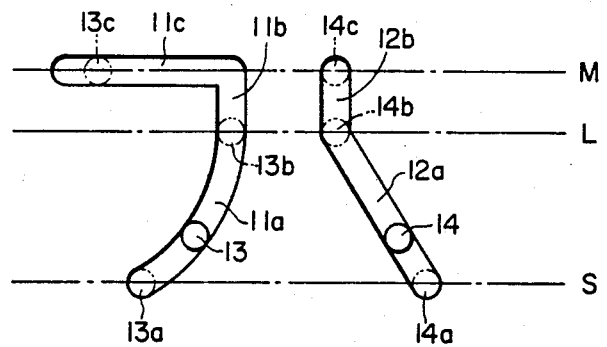
FIG. 3 is an enlarged view similar to FIG. 2 showing the arrangement of guide pins and slots in accordance with a second embodiment of the invention.

FIG. 3 is an enlarged view schematically showing the relationship between the guide pins and the slots of the cam sleeve 10 in a second preferred embodiment of the invention. Here, a linear slot 11b is formed in the circumferential direction extending from the telephoto end position 13b to the rear end of the slot 11c running in the optical axis direction for the macrophotographing range M. Corresponding to the slots 11b and 11c, a slot 12b continuous with the lead slot 12a extends from the position L to the position M in the circumferential direction. The positions of the guide pins 13 and 14 are designated by 13a, 14a at the wide angle end position S, 13b and 14b at the telephoto end position, and 13c, 14c for the macrophotographing range.

Figure 4:
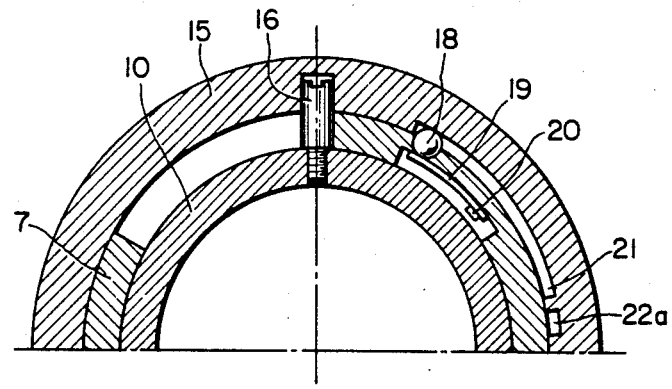
FIG. 4 is a cross-sectional view showing a first click-stop mechanism used with the invention.

FIG. 4 shows a click-stop mechanism for use in changing between the macrophotographing range and the regular zooming range and which is used with the structure shown in FIG. 3. Reference numeral 18 denotes a click ball, 19 a leaf spring for biasing the click balls 18 and 20 a screw for securing the spring 19. A suitable spacing or recess 21 is formed in order to prevent an increase in the rotation torque of the zooming operation sleeve 15. A click groove 22a corresponds to the macrophotographing range.

Figure 5:
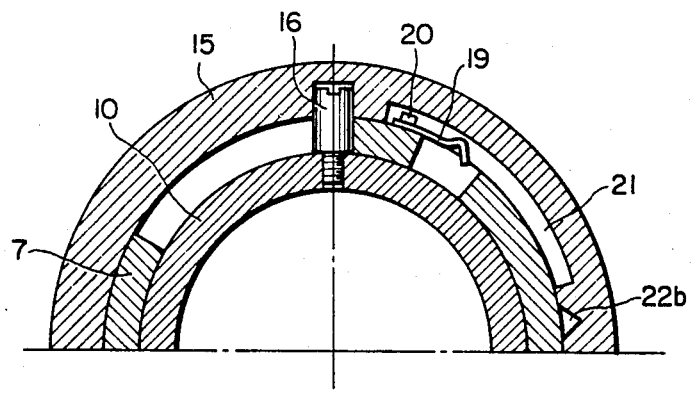
FIG. 5 is a cross-sectional view showing a second such click-stop mechanism.

FIG. 5 shows another mechanism for performing the click-stop function. A leaf spring 19 is attached to the fixed sleeve 7 by a screw 20. An end portion of the leaf spring 19 is bent as shown. Upon rotation of the zooming operation sleeve 15, the bent end portion of the leaf spring 19 comes to be positioned within a recess 21. In the macrophotographing range, the bent end portion of the leaf spring 19 is positioned in the groove 22b.

In operation, with regard to the FIG. 2 embodiment, in changing from the regular zooming operation to macrophotographing, the zooming operation sleeve 15 is positioned at the telephoto end position L. In this position, the linear guide slot 8 and the linear slot 11c engaged with the guide pin 13 both run parallel to the optical axis. Therefore, by moving the focus operation sleeve 3 along the optical axis, the focus operation sleeve 3, the sliding barrel 5 and the guide pin 13 are all moved in the direction of the optical axis to focus for macrophotographing. Upon stopping the focus operation sleeve 3 at an arbitrary position along the optical axis and then rotating the focus operation barrel 3, the focusing operation barrel 3 may be advanced by the helicoid thread to thereby focus for macrophotographing. During this operation, the cam sleeve 10 does not rotate because of the engagement of the guide pin 13 with the linear guide slot 8 and the linear slot 11c.

Using the click-stop mechanism of FIG. 4 or 5, when the zooming operation sleeve 15 is rotated during zooming operations, the zooming operation sleeve 15 is first stopped by abutment of the click ball 18 or the leaf spring 19 with an end of the recess 21. For macrophotographing, the zooming operation sleeve 15 is further rotated to the macrophotographing range M where the click-stop mechanism again operates. Since the slots 11b and 12b are circumferentially formed, the focal distance for the macrophotographing range is at that position the same as at the telephoto end position L. The other operations are the same as described above.

In the specific embodiments shown in FIGS. 2 and 3, though the slot 11a is formed as a cam slot and the slot 12a as a lead slot, both slots 11a and 11a may be cam slots. In FIG. 4, a V-shaped groove may be used instead of the rectangular groove 22a and in FIG. 5 a rectangular groove may be used instead of the V-shaped groove 22b. Thus, the invention is not limited to the specific embodiments shown and it is possible to modify the structure of these embodiments within the scope of the appended claims.

As mentioned above, by providing a linear slot which is continuous with the cam slot of the first lens group barrel at the telephoto end position which is parallel to the optical axis, the range of movement of the first lens group is increased and it is possible to make a smooth and continuous transfer from the telephoto end position at a high magnification factor to the macrophotographing range. With the lens structure of the invention, the zooming sleeve is prevented from being accidentally moved. With respect to the focus operationability of the lens, since the first lens group may be advanced both linearly along the optical axis and rotationally via the helicoid threads, very precise adjustments can be made and the time required for focusing is reduced. Furthermore, since a click-stop mechanism is provided in accordance with the present invention, the regular zooming and macrophotographing ranges are clearly separated to thereby prevent operational errors.

What is claimed is:

1. In a zoom lens barrel capable of performing macrophotographing operations including a zooming operation sleeve and a focus operation sleeve in which for zooming said zooming operation sleeve is rotated so that the positions of the first lens group and the second lens group are defined by a zooming cam slot and a lead slot formed in a cam sleeve and for focusing said focus operation sleeve is rotated to thereby determine the position of the first lens group in the direction of the optical axis, said zoom lens barrel being characterized in that a linear slot is provided extending from a telephoto end position of the zooming cam slot forwardly parallel to the optical axis direction of said lens groups.

2. The zoom lens barrel according to claim 1 wherein said lead slot is a cam slot.

3. The zoom lens barrel according to claim 1 or 2 wherein an additional circumferential slot is provided extending from the telephoto end position of said zooming cam slot and said linear slot and an additional circumferential slot is provided extending from said lead slot.

4. The zoom lens barrel according to claim 3 wherein a click-stop mechanism is provided for stopping the zooming operation sleeve at the telephoto end position of said zooming cam slot and at a macrophotographing range position.

5. A zoom lens comprising: a fixed sleeve having a mount portion; a support barrel disposed within said fixed sleeve and having a first guide pin rigidly coupled thereto; a cam sleeve disposed around portions of said fixed sleeve, said cam sleeve being provided with first and second slots therein, said first guide pin being slidably disposed in said first slot, said first slot having at least a first linear portion extending at an acute angle to the optical axis of said lens and said second slot having an arcuate first portion forming acute angles with respect to said optical axis of an opposite sign of the acute angle formed by said first portion of said first slot and said second slot having a linear second portion extending parallel to said optical axis; a zooming operation sleeve coupled to rotate with said cam sleeve; a slidable sleeve having a second guide pin rigidly coupled thereto, said second guide pin being slidably disposed in said second slot and said slidable sleeve having a threaded inner portion; and a focusing operation sleeve having a portion thereof in threaded engagement with said threaded inner portion.

6. The zoom lens of claim 5 wherein said first slot further comprises a second portion extending from an end of said first portion closest to said second slot, said second portion of said first slot extending perpendicular to said optical axis and said second slot having a linear portion parallel to second portion of said first slot extending between said arcuate portion and said linear second portion.

7. The zoom lens of claim 5 or 6 further comprising a click-stop mechanism for stopping said zooming operation sleeve at a position corresponding to the position of said second pin at the juncture between said first and second portions of said first slot and at the opposite end portion of said second portion of said first slot.

8. The zoom lens of claim 5 or 6 further comprising an outer sleeve disposed around portions of said cam sleeve, said outer sleeve being rigidly coupled to said fixed sleeve.

9. The zoom lens of claim 5 or 6 further comprising a divergent first lens group operationally coupled to said focusing operation sleeve and a convergent second lens group operationally coupled to said support barrel.

10. The zoom lens of claim 5 or 6 wherein said fixed sleeve is provided with first and second linear guide slots extending parallel to said optical axis, said first and second guide pins extending, respectively, through said first and second guide slots to said slots in said cam sleeve.

* * * * *